US010085385B2

(12) United States Patent
Yajima et al.

(10) Patent No.: US 10,085,385 B2
(45) Date of Patent: Oct. 2, 2018

(54) PLANT CULTIVATION APPARATUS (71) Applicant: Panasonic Intellectual Property Management Co., Ltd., Osaka (JP)

(72) Inventors: Masatoshi Yajima, Osaka (JP); Akifumi Hashimoto, Osaka (JP); Kenji Kawano, Osaka (JP); Masahiro Yamazaki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/072,841

(22) Filed: Mar. 17, 2016

(65) Prior Publication Data
US 2016/0192599 A1    Jul. 7, 2016

Related U.S. Application Data (63) Continuation of application No. PCT/JP2014/004198, filed on Aug. 18, 2014.

(30) Foreign Application Priority Data

Sep. 19, 2013   (JP) ................................. 2013-193824

(51) Int. Cl.
*A01G 7/04* (2006.01)
*F21V 23/00* (2015.01)
(Continued)

(52) U.S. Cl.
CPC ............ *A01G 7/045* (2013.01); *F21V 23/003* (2013.01); *F21Y 2115/10* (2016.08); *F21Y 2115/30* (2016.08); *Y02P 60/146* (2015.11)

(58) Field of Classification Search
CPC ........ A01G 7/045; A01G 9/20; F21V 33/0028
(Continued)

(56) References Cited

U.S. PATENT DOCUMENTS 8,523,385 B2 *  9/2013  Lu .......................... A01G 7/045
                                                        362/2
8,760,077 B2 *  6/2014  Jiang ................. H05B 37/0218
                                                        315/294
(Continued)

FOREIGN PATENT DOCUMENTS

JP     2006-304610 A    11/2006
JP     2011-076051 A     4/2011
(Continued)

OTHER PUBLICATIONS

International Search Report issued in Application No. PCT/JP2014/004198 dated Nov. 18, 2014, with English Translation.

*Primary Examiner* — William N Harris
(74) *Attorney, Agent, or Firm* — McDermott Will & Emery LLP (57) ABSTRACT

A plant cultivation apparatus of the present disclosure includes a first light source unit configured to include a first laser diode radiating a first light beam, and a first scanning mechanism scanning the first light beam and forming a first radiation region, a second light source unit configured to include a second laser diode radiating a second light beam, and a second scanning mechanism scanning the second light beam and forming a second radiation region, and a signal processor configured to control the first light source unit and the second light source unit. A wavelength of the first light beam is the same as a wavelength of the second light beam. The signal processor forms a multiple radiation region by causing the first radiation region and the second radiation region to overlap each other.

19 Claims, 10 Drawing Sheets

(51) Int. Cl.
*F21Y 115/30* (2016.01)
*F21Y 115/10* (2016.01)

(58) Field of Classification Search
USPC .............................................. 362/1
See application file for complete search history.

(56) References Cited

U.S. PATENT DOCUMENTS

| | | | |
|---|---|---|---|
| 9,226,454 B2* | 1/2016 | Kim | A01G 7/045 |
| 2007/0289207 A1* | 12/2007 | May | A01G 7/00 |
| | | | 47/17 |
| 2010/0115837 A1* | 5/2010 | Van Der Poel | A01G 7/045 |
| | | | 47/66.6 |
| 2011/0057117 A1* | 3/2011 | Fawcett | B01L 7/52 |
| | | | 250/458.1 |
| 2011/0058867 A1 | 3/2011 | Kodera et al. | |

FOREIGN PATENT DOCUMENTS

| | | |
|---|---|---|
| JP | 2011-097900 A | 5/2011 |
| JP | 2012-005453 A | 1/2012 |

\* cited by examiner

PLANT CULTIVATION APPARATUS

RELATED APPLICATIONS

This application is a Continuation of International Application No. PCT/JP2014/004198, filed on Aug. 18, 2014, which in turn claims the benefit of Japanese Application No. 2013-193824, filed on Sep. 19, 2013, the disclosures of which are incorporated by reference herein.

BACKGROUND OF THE INVENTION

1. Field of the Invention

The present disclosure relates to a technology for cultivating plants with an artificial light source.

2. Description of the Related Art

In recent years, a research is being conducted on cultivating plants using an artificial light source, such as a fluorescent light, a Light Emitting Diode (LED), or a laser diode, and is put to practical use as an artificial light plant factory or a sunlight and artificial light combined plant factory. Light sources for illumination occupy most of the initial cost for establishment of such a plant factory, and there are also running costs such as fuel and lighting costs, and thus, to run a plant factory at a low cost, selection of specifications and design of structures of light sources for illumination are extremely important.

As an illumination light source for such a plant factory, PTL 1 discloses a structure for detecting chloroplasts for cultivation by an imaging section, and for radiating light emitted by a laser diode on plants for cultivation by a scanning mechanism for two-dimensional scanning.

CITATION LIST

Patent Literature

PTL 1: Unexamined Japanese Patent Publication No. 2012-5453

SUMMARY OF THE INVENTION

A plant cultivation apparatus of the present disclosure includes a first light source unit configured to include a first laser diode radiating a first light beam, and a first scanning mechanism scanning the first light beam and forming a first radiation region, a second light source unit configured to include a second laser diode radiating a second light beam, and a second scanning mechanism for scanning the second light beam and forming a second radiation region, and a signal processor configured to control the first light source unit and the second light source unit. A wavelength of the first light beam is the same as a wavelength of the second light beam. The signal processor forms a multiple radiation region by causing the first radiation region and the second radiation region to overlap each other.

According to the plant cultivation apparatus of the present disclosure, light can be radiated at an increased light intensity by a simple, inexpensive structure.

DETAILED DESCRIPTION OF THE PREFERRED EMBODIMENTS

Hereinafter, exemplary embodiments will be described in detail with reference to the drawings as appropriate. However, unnecessarily detailed description may be omitted. For example, detailed description of already well-known matters and repeated description of substantially the same structure may be omitted. All of such omissions are intended to facilitate understanding by those skilled in the art by preventing the following description from becoming unnecessarily redundant.

Moreover, the appended drawings and the following description are provided for those skilled in the art to fully understand the present disclosure, and are not intended to limit the subject described in the claims.

According to the structure of a plant cultivation apparatus of PTL 1, some types of plants require an extremely high light intensity for cultivating, and to achieve a high light intensity, an expensive high output laser diode with an output of several watts, which is used for a laser display or the like, has to be used. Furthermore, in the case of using a high-output laser diode, it is necessary to consider the heat radiation of the laser diode in terms of life at the time of high-output light emission.

A plant cultivation apparatus of the present disclosure provides a plant cultivation apparatus that emits light at an increased light intensity by a simple, inexpensive structure.

First Exemplary Embodiment

1-1. Structure of Light Source Section

Figure 1:
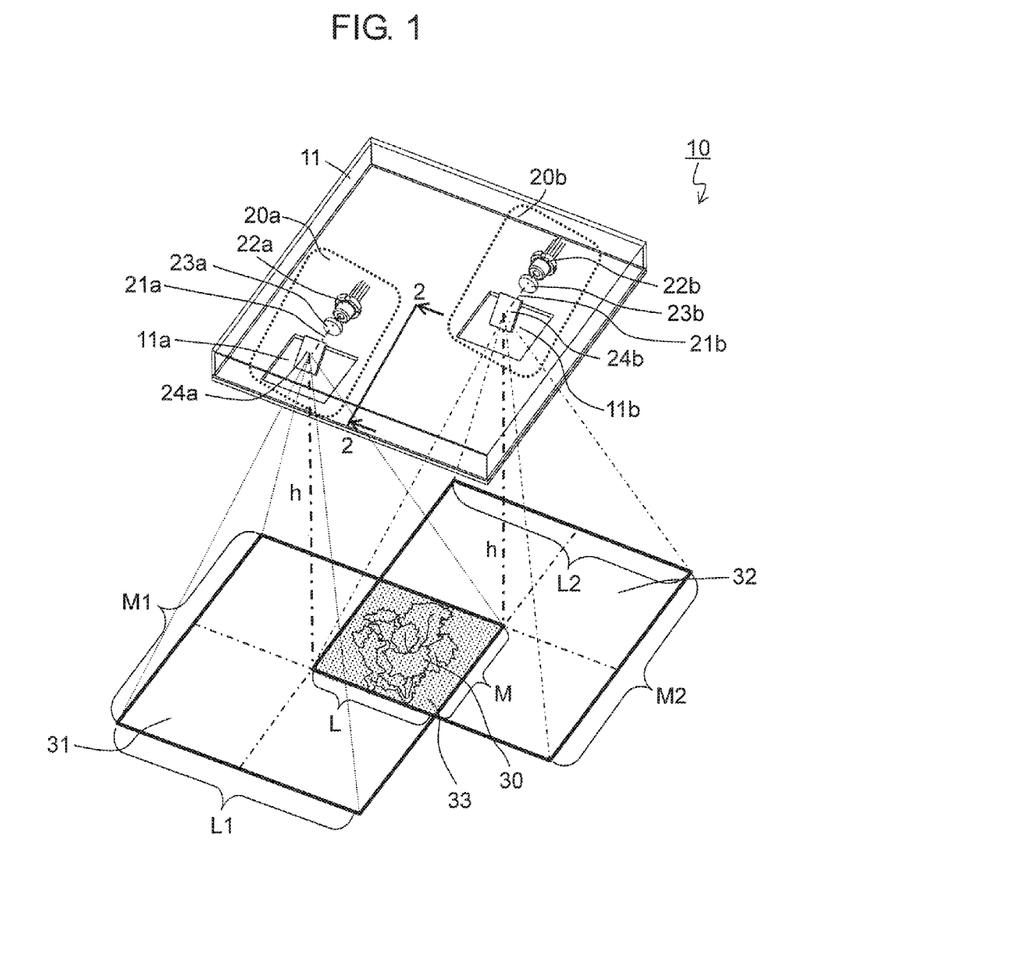
FIG. 1 is a perspective diagram of a structure of a light source section according to a first exemplary embodiment, and a radiation region thereof.
Figure 2:
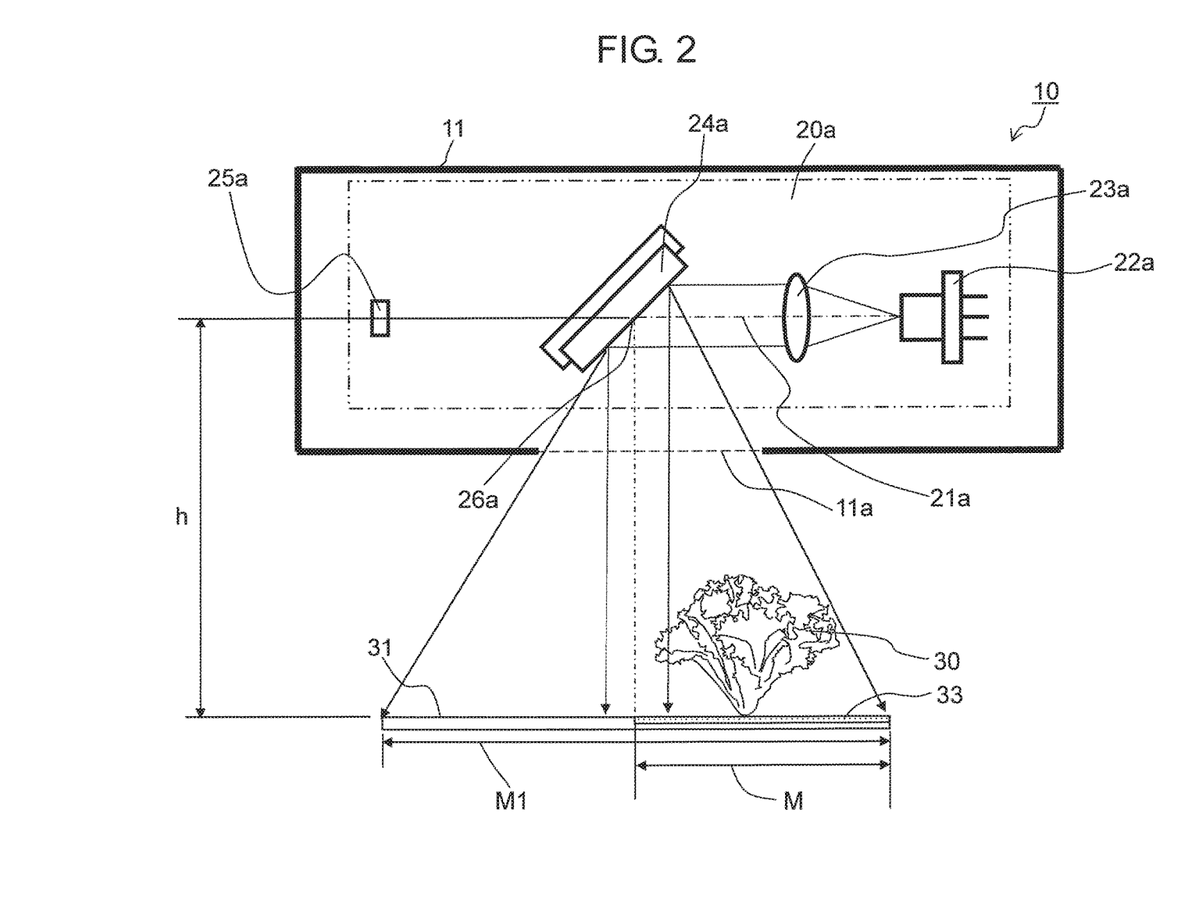
FIG. 2 is a cross-sectional diagram along 2-2 in FIG. 1.

A plant cultivation apparatus according to a first exemplary embodiment includes a light source section, and the light source section will be described first in detail. FIG. 1 is a perspective diagram showing the structure of light source section 10 according to the present exemplary embodiment, and a radiation region thereof. FIG. 2 is a cross-sectional diagram along 2-2 in FIG. 1.

Light source section 10 includes first light source unit 20a and second light source unit 20b, and first light source unit 20a and second light source unit 20b are disposed inside outer box 11. Opening sections 11a and 11b are provided to outer box 11, and two-dimensionally scanned first light beam 21a of first light source unit 20a is radiated out from opening section 11a, and two-dimensionally scanned second light beam 21b of second light source unit 20b is radiated out from opening section 11b. First light source unit 20a and second light source unit 20b have the same structure. Light source section 10 irradiates plant 30.

First light source unit 20a includes first laser diode 22a for emitting first light beams 21a, first lens 23a for making first light beams 21a substantially parallel light, and first mirror scanning mechanism 24a for deflecting, while two-dimensionally scanning, first light beams 21a which have been made into substantially parallel light by first lens 23a. Moreover, there is provided first monitoring section 25a for monitoring a light intensity of first light beam 21a emitted by first laser diode 22a.

Light is emitted from first laser diode 22a by performing power activation to a drive circuit and operating the drive circuit described later. First mirror scanning mechanism 24a is operated by the drive circuit described later, and planar first radiation region 31 is formed by two-dimensional scanning of first light beam 21a of a point state to a radiated surface. The distance between first reflection point 26a of first mirror scanning mechanism 24a and plant 30 is defined as h.

Second light source unit 20b includes second laser diode 22b for emitting second light beams 21b, second lens 23b for making second light beams 21b substantially parallel light, and second mirror scanning mechanism 24b for deflecting, while two-dimensionally scanning, second light beams 21b which have been made into substantially parallel light by second lens 23b. Moreover, there is provided a second monitoring section, not shown, for monitoring a light intensity of second light beam 21b emitted by second laser diode 22b.

Light is emitted from second laser diode 22b by performing power activation to the drive circuit described later and operating the drive circuit. Second mirror scanning mechanism 24b is operated by the drive circuit described later, and planar second radiation region 32 is formed by two-dimensional scanning of second light beam 21b of a point state to a radiated surface. The distance between second reflection point, not shown, of second mirror scanning mechanism 24b and plant 30 is defined as h.

Figure 3:
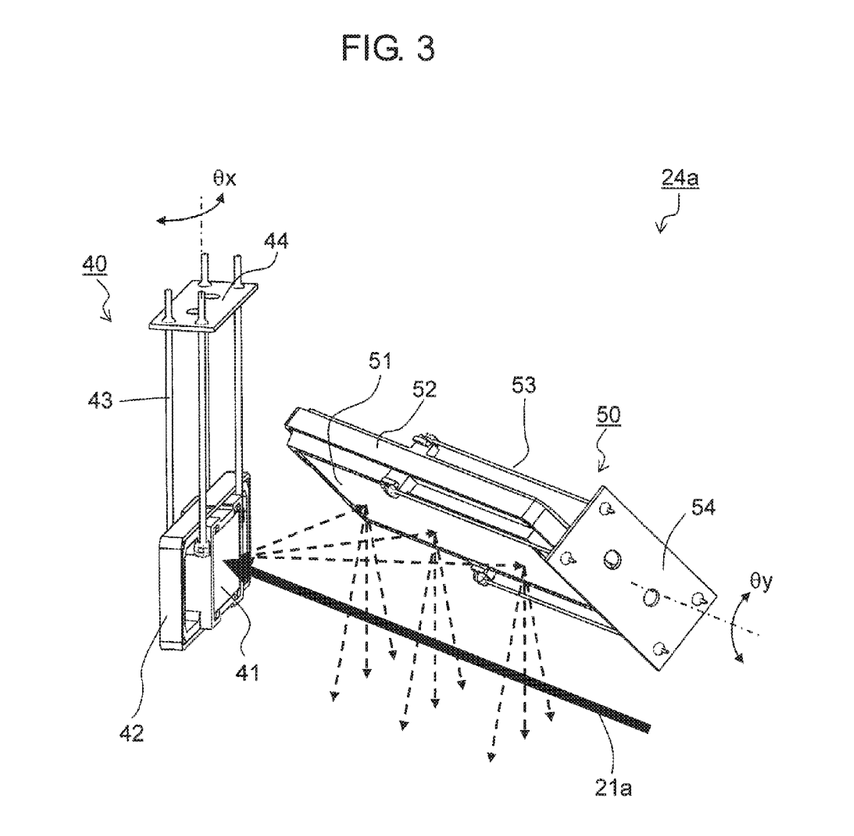
FIG. 3 is a diagram showing a first mirror scanning mechanism according to the first exemplary embodiment.

Next, first mirror scanning mechanism 24a will be described in detail. FIG. 3 is a diagram showing the structure of first mirror scanning mechanism 24a of the present exemplary embodiment. First mirror scanning mechanism 24a includes mirror scanning mechanism 40 for controlling an θx direction, which is a horizontal direction, and mirror scanning mechanism 50 for controlling a θy direction, which is a vertical direction.

Mirror scanning mechanism 40 for controlling the θx direction includes mirror 41, mirror holding unit 42 for holding mirror 41, and fixing substrate 44 for supporting mirror holding unit 42 by suspension wire 43.

A coil, not shown, is wound around mirror holding unit 42, and this coil is connected by suspension wire 43 to a conductive line, not shown, disposed on fixing substrate 44.

Moreover, a current is applied by the drive circuit described later, and the current flows through the coil, not shown, via the conductive line, not shown, on fixing substrate 44 and via suspension wire 43, and the angle of mirror 41 is controlled by rotational oscillation.

In the same manner, mirror scanning mechanism 50 for controlling the θy direction includes mirror 51, mirror holding unit 52 for holding mirror 51, and fixing substrate 54 for supporting mirror holding unit 52 by suspension wire 53.

A coil, not shown, is wound around mirror holding unit 52, and this coil is connected by suspension wire 53 to a conductive line, not shown, disposed on fixing substrate 54.

Moreover, a current is applied by the drive circuit described later, and the current flows through the coil, not shown, via the conductive line, not shown, on fixing substrate 54 and via suspension wire 53, and the angle of mirror 51 is controlled by rotational oscillation.

First light beam 21a is two-dimensionally scanned in this manner, and planar first radiation region 31 is formed.

Second mirror scanning mechanism 24b has the same structure as first mirror scanning mechanism 24a, and two-dimensionally scans second light beam 21b, and forms planar second radiation region 32.

A wavelength of light that is emitted by first laser diode 22a or second laser diode 22b is desirably in a red wavelength band of 630 nanometer (nm) to 680 nm, or in a blue wavelength band of 380 nm to 500 nm.

Additionally, a green wavelength band or an infrared wavelength band may also be used if effective for plant growing. Also, output of about 100 mW is sufficient with respect to both the red wavelength band and the blue wavelength band. Moreover, a laser diode having such properties is used for an optical pickup for recording information on inexpensive optical discs for Blu-ray (registered trademark) Disc (BD) recorders, Digital Versatile Disc (DVD) recorders and the like, commercially available in large quantities.

1-2. Setting of Multiple Radiation Region

As shown in FIG. 1, first light source unit 20a and second light source unit 20b are disposed in such a way that there exists multiple radiation region 33 where first radiation region 31 of first light source unit 20a and second radiation region 32 of second light source unit 20b are overlapped with each other, multiple radiation region 33 including plant 30.

Since first radiation region 31 and second radiation region 32 are overlapped, a light intensity for multiple radiation region 33 is a light intensity obtained by adding a light intensity of first light source unit 20a and a light intensity of second light source unit 20b. The area of multiple radiation region 33 may be set according to the size of plant 30 for cultivation, and is desirably a quarter or more of the area of first radiation region 31 or second radiation region 32.

Now, in the case where plant 30 for cultivation is red-leaf lettuce, the size of one red-leaf lettuce is a square whose sides are about 15 cm each, and thus setting may be performed such that the lengths of sides L1 and M1 of first radiation region 31 and sides L2 and M2 of second radiation region 32 are 30 cm each, and the lengths of overlapping parts of sides L and M are 15 cm or more. Additionally, L1 and L2, and M1 and M2 may be of the same length or of different lengths as long as the lengths are set such that a quarter or more of the area of first radiation region 31 may be ensured.

Now, when the swing angles of first mirror scanning mechanism 24a for two-dimensional scanning are defined as θx1 and θy1, and the swing angles of second mirror scanning mechanism 24b for two-dimensional scanning are defined as θx2 and θy2, setting may be performed by the following formulae based on the relationships of the lengths of the sides of first radiation region 31 and second radiation region 32, distance h between first reflection point 26a of first mirror scanning mechanism 24a and plant 30, and distance h between a second reflection point, not shown, of second mirror scanning mechanism 24b and plant 30.

$$\theta x1 = \arctan(L1/2h)/2$$

$$\theta y1 = \arctan(M1/2h)/2$$

$$\theta x2 = \arctan(L2/2h)/2$$

$$\theta y2 = \arctan(M2/2h)/2$$

According to the above, if, for example, $L1=L2=M1=M2=30$ cm and $h=20$ cm, $\theta x1=\theta y1=\theta x2=\theta y2=18.4$ degrees.

1-3. Structure of Plant Cultivation Apparatus

Figure 4:
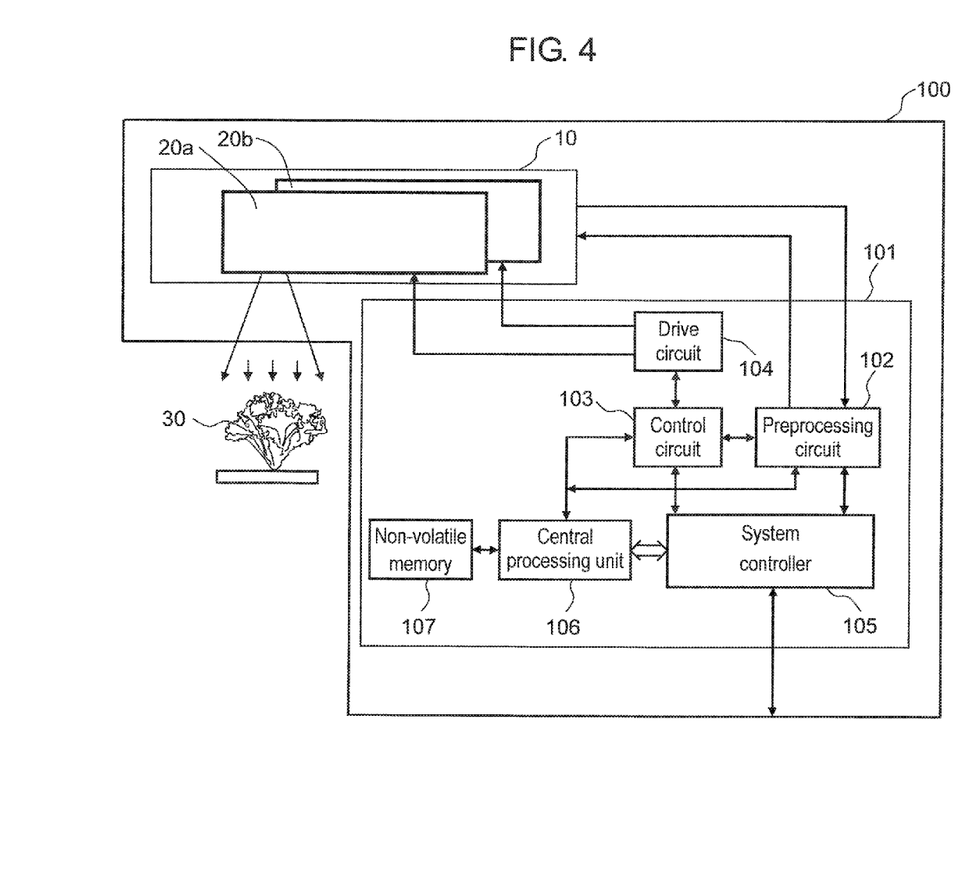
FIG. 4 is a structural diagram of a plant cultivation apparatus according to the first exemplary embodiment.

FIG. 4 is a structural diagram of plant cultivation apparatus 100 according to the first exemplary embodiment. Plant cultivation apparatus 100 includes light source section 10 and signal processor 101. Signal processor 101 includes preprocessing circuit 102, control circuit 103, drive circuit 104, system controller 105, central processing unit 106, and non-volatile memory 107.

Preprocessing circuit 102 generates electrical signals of light intensities from first monitoring section 25a and the second monitoring section of light source section 10, and inputs the signals to control circuit 103. Control circuit 103 causes drive circuit 104 to control the levels of light intensities of first laser diode 22a and second laser diode 22b of light source section 10, and to control the operation ranges and the operation speeds of first mirror scanning mechanism 24a and second mirror scanning mechanism 24b. Drive circuit 104 is connected to first laser diode 22a, second laser diode 22b, first mirror scanning mechanism 24a, and second mirror scanning mechanism 24b. Control circuit 103 performs the series of controls by digital control.

Digital signal processing is performed by system controller 105 on the electrical signal of light intensity generated by preprocessing circuit 102. Preprocessing circuit 102, control circuit 103, and system controller 105 are connected to central processing unit 106, and operate according to commands from central processing unit 106. A program specifying a series of operations including a control operation of causing first laser diode 22a to radiate first light beam 21a, of causing second laser diode 22b to radiate second light beam 21b, and of operating first mirror scanning mechanism 24a and second mirror scanning mechanism 24b to thereby perform optimal radiation on plant 30 for cultivation is stored in advance in non-volatile memory 107 as firmware. Such firmware is read by central processing unit 106 from non-volatile memory 107 according to the mode of a necessary operation.

Additionally, description is given on plant cultivation apparatus 100 assuming that there is one signal processor 101 for one light source section 10, but such a case is not restrictive. For example, there may be one signal processor 101 for a plurality of light source sections 10, or signal processor 101 may correspond to a light source section described in a second exemplary embodiment or a third exemplary embodiment described later.

Figure 5:
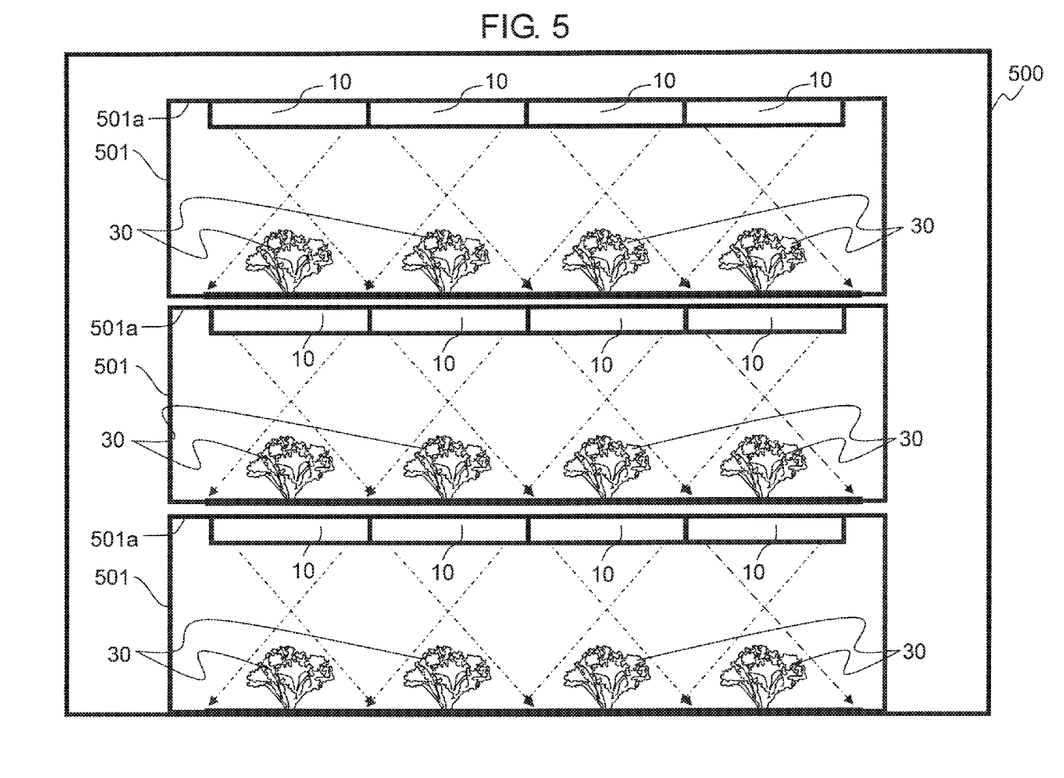
FIG. 5 is a schematic diagram of a plant factory according to the first exemplary embodiment.

FIG. 5 is a diagram showing plant factory 500 according to the present exemplary embodiment. At plant factory 500, a plurality of plant growing racks 501 are stacked upon one another. A plurality of light source sections 10 are attached on rack upper surface 501a of each plant growing rack 501. Signal processor 101, not shown in FIG. 5, performs setting regarding the light intensity and the radiation time for radiating on plant 30, with respect to the plurality of light source sections 10.

1-4. Effects

As described above, the plant cultivation apparatus according to the present exemplary embodiment includes a first light source unit configured to include a first laser diode radiating a first light beam, and a first scanning mechanism scanning the first light beam and forming a first radiation region, a second light source unit configured to include a second laser diode radiating a second light beam, and a second scanning mechanism scanning the second light beam and forming a second radiation region, and a signal processor configured to control the first light source unit and the second light source unit. A wavelength of the first light beam is the same as a wavelength of the second light beam. The signal processor forms a multiple radiation region by causing the first radiation region and the second radiation region to overlap each other.

Accordingly, the light intensity for a radiation region can be increased by a simple structure, and the radiation condition for growing plants can be optimized, and thus it is possible to use an inexpensive laser diode which is used for BD recorders or DVD recorders that are commercially available in large quantities, instead of an expensive high-output laser diode for a laser display. The inexpensive laser diode is advantageous in heat radiation characteristics since high output is not required, and application to plants requiring a high light intensity is made possible.

Furthermore, with the plant cultivation apparatus according to the present exemplary embodiment, the area of the multiple radiation region is a quarter or more of the area of one of the first radiation region and the second radiation region.

Accordingly, an optimal multiple radiation region can be set according to the size of plant 30 for cultivation.

Moreover, with the plant cultivation apparatus according to the present exemplary embodiment, first light source unit 20a is disposed diagonally to second light source unit 20b.

Accordingly, the multiple radiation region can be set to have a substantially square shape, and the optimal multiple radiation region can be set according to the size of plant 30 for cultivation.

1-5. Another Structure of Light Source Section

Figure 6:
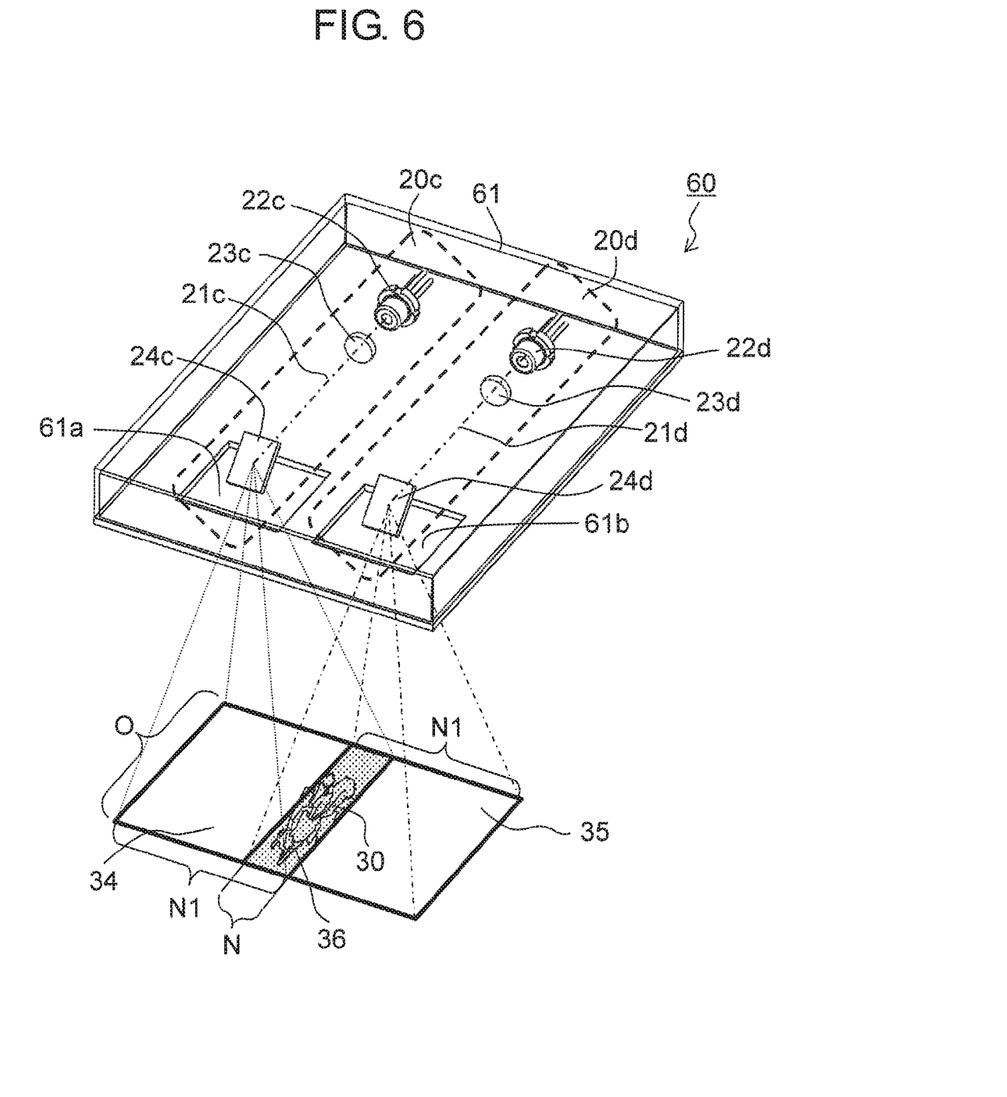
FIG. 6 is a perspective diagram of another structure of the light source section according to the first exemplary embodiment, and a radiation region thereof.

FIG. 6 is a perspective diagram of the structure of light source section 60 according to the present exemplary embodiment, and a radiation region thereof. FIG. 6 is a perspective diagram showing a structure where first light source unit 20c and second light source unit 20d are disposed substantially in parallel to each other. FIG. 6 shows a case that first light source unit 20c and second light source unit 20d may be arranged substantially parallel to each other depending on the size of plant 30 for cultivation.

Light source section 60 includes first light source unit 20c and second light source unit 20d, and first light source unit 20c and second light source unit 20d are disposed inside outer box 61. Opening sections 61a and 61b are provided to outer box 61, and two-dimensionally scanned first light beam 21c of first light source unit 20c is radiated out from opening section 61a, and two-dimensionally scanned second light beam 21d of second light source unit 20d is radiated out from opening section 61b. First light source unit 20c and second light source unit 20d have the same structure. Light source section 60 irradiates plant 30.

First light source unit 20c includes first laser diode 22c for emitting first light beams 21c, first lens 23c for making first light beams 21c substantially parallel light, and first mirror scanning mechanism 24c for deflecting, while two-dimensionally scanning, first light beams 21c which have been made into substantially parallel light by first lens 23c. Moreover, there is provided a first monitoring section, not shown, for monitoring the light intensity of first light beam 21c emitted by first laser diode 22c.

Light is emitted from first laser diode 22c by performing power activation to drive circuit 104 and operating drive circuit 104. First mirror scanning mechanism 24c is operated by drive circuit 104, and planar first radiation region 34 is formed by two-dimensional scanning of first light beam 21c of a point state to a radiated surface.

Second light source unit 20d includes second laser diode 22d for emitting second light beams 21d, second lens 23d for making second light beams 21d substantially parallel light, and second mirror scanning mechanism 24d for deflecting, while two-dimensionally scanning, second light beams 21d which have been made into substantially parallel light by second lens 23d. Moreover, there is provided a second monitoring section, not shown, for monitoring the light intensity of second light beam 21d emitted by second laser diode 22d.

Light is emitted from second laser diode 22d by performing power activation to drive circuit 104 and operating drive circuit 104. Second mirror scanning mechanism 24d is operated by drive circuit 104, and planar second radiation region 35 is formed by two-dimensional scanning of second light beam 21d of a point state to a radiated surface.

First light source unit 20c and second light source unit 20d are disposed in such a way that there exists multiple radiation region 36 where first radiation region 34 of first light source unit 20c and second radiation region 35 of second light source unit 20d are overlapped with each other, multiple radiation region 36 including plant 30.

Since first radiation region 34 and second radiation region 35 are overlapped, a light intensity for multiple radiation region 36 is a light intensity obtained by adding a light intensity of first light source unit 20c and a light intensity of second light source unit 20d.

When the sides of first radiation region 34 are defined as N1 and O, the sides of second radiation region 35 are defined as N1 and O, and the sides of multiple radiation region 36 are defined as N and O, area S of overlapped multiple radiation region 36 is defined as:

$$S = N \times O = (N1 \times O)/4.$$

1-6. Effects

As described above, with light source section 60 according to the present exemplary embodiment, the first light source unit is disposed in parallel to the second light source unit.

Light source section 60 can thus achieve the same effects as light source section 10. That is, the light intensity for a radiation region can be increased by a simple structure, and the radiation condition for growing plants can be optimized, and thus it is possible to use an inexpensive laser diode which is used for BD recorders or DVD recorders that are commercially available in large quantities, instead of an expensive high-output laser diode for a laser display. The inexpensive laser diode is advantageous in heat radiation characteristics since high output is not required, and application to plants requiring a high light intensity is made possible.

Moreover, the multiple radiation region can be set to be rectangular, and an optimal multiple radiation region can be set according to the size of plant 30 for cultivation.

Furthermore, first laser diode 22c and second laser diode 22d may be of the same wavelength or of different wavelengths depending on plant 30 for cultivation. For example, lettuces can be grown by just the red wavelength band, but hot peppers need the blue wavelength band in addition to the red wavelength band, and in this case, first laser diode 22c may be in the blue wavelength band, and second laser diode 22d in the red wavelength band.

Second Exemplary Embodiment 2-1. Structure of Light Source Section

Next, a light source section of a plant cultivation apparatus according to a second exemplary embodiment will be described. In the first exemplary embodiment, the number of light source units of the light source section is two, but in the present exemplary embodiment, description will be given on a case where there are four light source units in the light source section, and a case where there are six.

Figure 7:
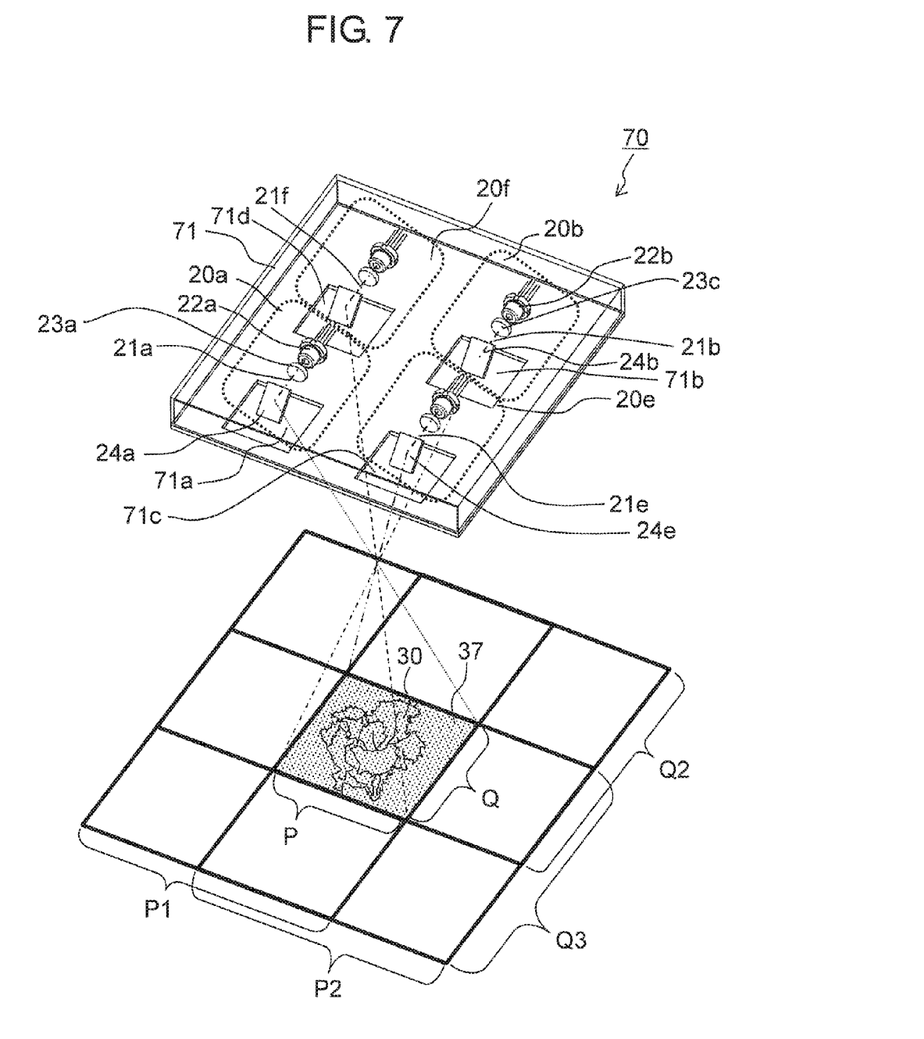
FIG. 7 is a perspective diagram of a structure of a light source section according to a second exemplary embodiment, and a radiation region thereof.

FIG. 7 is a perspective diagram showing the structure of light source section 70 according to the present exemplary embodiment, and a radiation region thereof. In FIG. 7, light source section 70 includes, in addition to first light source unit 20a and second light source unit 20b, third light source unit 20e and fourth light source unit 20f.

Light source section 70 includes first light source unit 20a, second light source unit 20b, third light source unit 20e, and fourth light source unit 20f, and first light source unit 20a, second light source unit 20b, third light source unit 20e, and fourth light source unit 20f are disposed inside outer box 71. Opening sections 71a, 71b, 71c, and 71d are provided to outer box 71, and two-dimensionally scanned first light beam 21a of first light source unit 20a is radiated out from opening section 71a, two-dimensionally scanned second light beam 21b of second light source unit 20b is radiated out from opening section 71b, two-dimensionally scanned third light beam 21e of third light source unit 20e is radiated out from opening section 71c, and two-dimensionally scanned fourth light beam 21f of fourth light source unit 20f is radiated out from opening section 71d. First light source unit 20a, second light source unit 20b, third light source unit 20e, and fourth light source unit 20f have the same structure, and thus detailed description of third light source unit 20e and fourth light source unit 20f will be omitted. Light source section 70 irradiates plant 30.

A first radiation region of first light source unit 20a is a region having sides P1 and sides Q3, a second radiation region of second light source unit 20b is a region having sides P2 and sides Q2, a third radiation region of third light source unit 20e is a region having sides P2 and sides Q3, and a fourth radiation region of fourth light source unit 20f is a region having sides P1 and sides Q2, and first light source unit 20a, second light source unit 20b, third light source unit 20e, and fourth light source unit 20f are disposed in such a way that there exists multiple radiation region 37 where the first radiation region of first light source unit 20a, the second radiation region of second light source unit 20b, the third radiation region of third light source unit 20e, and the fourth radiation region of fourth light source unit 20f are overlapped with one another, multiple radiation region 37 including plant 30.

By forming multiple radiation region 37 by having regions whose areas are each a quarter of the area of the corresponding region among the first radiation region, the second radiation region, the third radiation region, and the fourth radiation region overlap one another, a light intensity that is four times the light intensity from each light source unit on multiple radiation region 37 can be obtained for the light intensity for the multiple radiation region.

Additionally, in FIG. 7, the multiple radiation region is formed by having four radiation regions radiated by four light source units overlap one another, but such a case is not restrictive. For example, the multiple radiation region may be formed by having three radiation regions radiated by three light source units overlap one another, or the multiple radiation region may be formed by having five or more radiation regions radiated by five or more light source units overlap one another.

Figure 8:
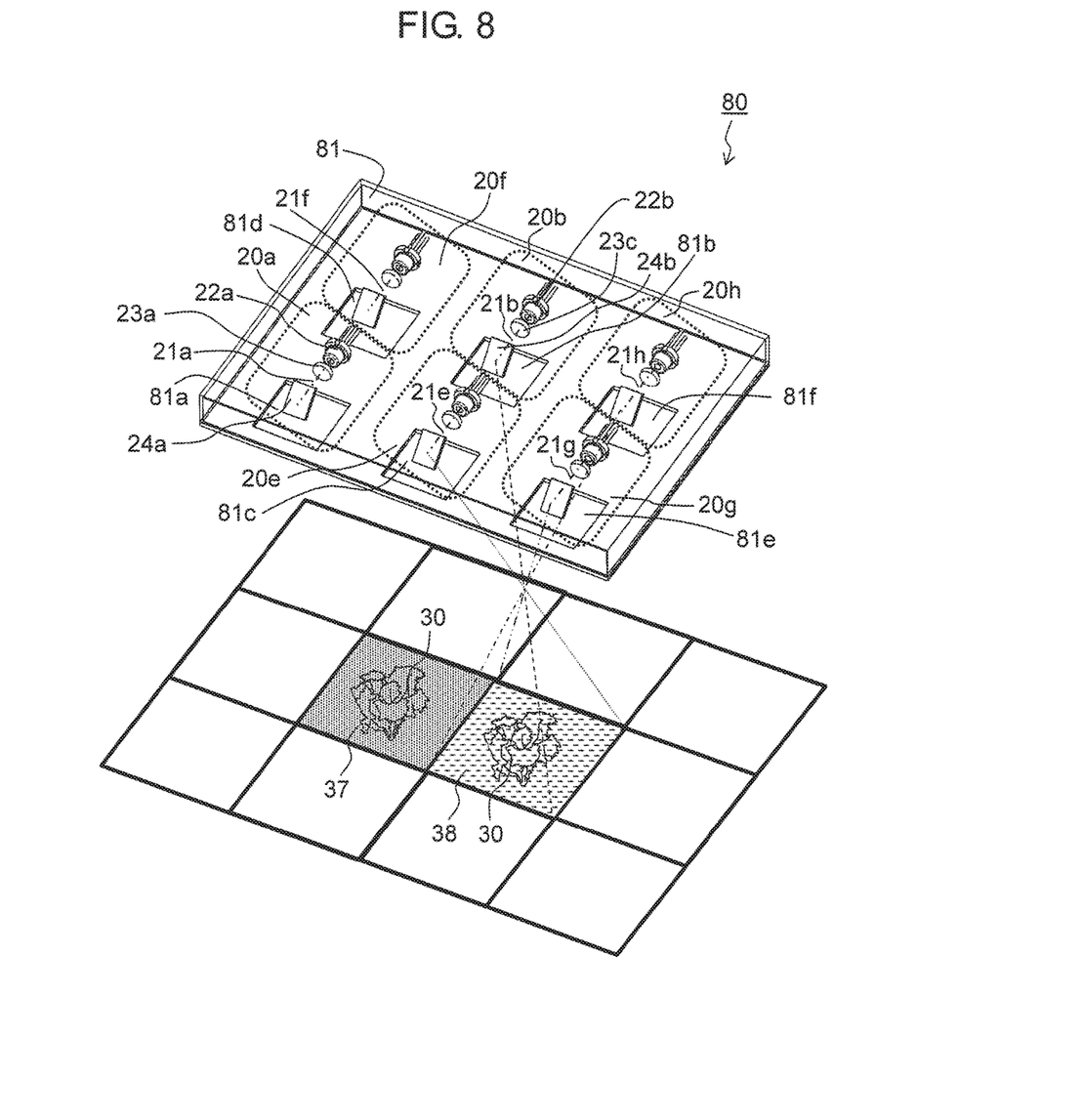
FIG. 8 is a perspective diagram of another structure of the light source section according to the second exemplary embodiment, and a radiation region thereof.

FIG. 8 is a perspective diagram showing the structure of light source section 80 according to the present exemplary embodiment, and a radiation region thereof. In FIG. 8, light source section 80 includes, in addition to first light source unit 20a, second light source unit 20b, third light source unit 20e and fourth light source unit 20f, fifth light source unit 20g and sixth light source unit 20h.

Light source section 80 includes first light source unit 20a, second light source unit 20b, third light source unit 20e, fourth light source unit 20f, fifth light source unit 20g, and sixth light source unit 20h, and first light source unit 20a, second light source unit 20b, third light source unit 20e, fourth light source unit 20f, fifth light source unit 20g, and sixth light source unit 20h are disposed inside outer box 71. Opening sections 81a, 81b, 81c, 81d, 81e, and 81f are provided to outer box 81, and two-dimensionally scanned first light beam 21a of first light source unit 20a is radiated out from opening section 81a, two-dimensionally scanned second light beam 21b of second light source unit 20b is radiated out from opening section 81b, two-dimensionally scanned third light beam 21e of third light source unit 20e is radiated out from opening section 81c, two-dimensionally scanned fourth light beam 21f of fourth light source unit 20f is radiated out from opening section 81d, two-dimensionally scanned fifth light beam 21g of fifth light source unit 20g is radiated out from opening section 81e, and two-dimensionally scanned sixth light beam 21h of sixth light source unit 20h is radiated out from opening section 81f. First light source unit 20a, second light source unit 20b, third light source unit 20e, fourth light source unit 20f, fifth light source unit 20g, and sixth light source unit 20h have the same structure, and thus detailed description of fifth light source unit 20g and sixth light source unit 20h will be omitted. Light source section 80 irradiates two plants 30.

First light source unit 20a, second light source unit 20b, third light source unit 20e, and fourth light source unit 20f are disposed in such a way that there exists multiple radiation region 37 where the first radiation region of first light source unit 20a, the second radiation region of second light source unit 20b, the third radiation region of third light source unit 20e, and the fourth radiation region of fourth light source unit 20f are overlapped with one another, multiple radiation region 37 including plant 30.

By forming multiple radiation region 37 by having regions whose areas are each a quarter of the area of the corresponding region among the first radiation region, the second radiation region, the third radiation region, and the fourth radiation region overlap one another, a light intensity that is four times the light intensity from each light source unit on multiple radiation region 37 can be obtained for the light intensity for the multiple radiation region.

Third light source unit 20e, fourth light source unit 20f, fifth light source unit 20g, and sixth light source unit 20h are disposed in such a way that there exists multiple radiation region 38 where the third radiation region of third light source unit 20e, the fourth radiation region of fourth light source unit 20f, the fifth radiation region of fifth light source unit 20g, and the sixth radiation region of sixth light source unit 20h are overlapped with one another, multiple radiation region 38 including plant 30.

By forming multiple radiation region 38 by having regions whose areas are each a quarter of the area of the corresponding region among the third radiation region, the fourth radiation region, the fifth radiation region, and the sixth radiation region overlap one another, a light intensity that is four times the light intensity from each light source unit on multiple radiation region 38 can be obtained for the light intensity for the multiple radiation region.

Even in the case of a growing region having a large growing area such as a plant factory, the area can be increased in the manner of multiple radiation regions 37 and 38 with high light intensities.

2-2. Effects

As described above, the plant cultivation apparatus according to the present exemplary embodiment further includes a third light source unit configured to include a third laser diode radiating a third light beam, and a third scanning mechanism scanning the third light beam and forming a third radiation region. And the signal processor controls the first light source unit, the second light source unit and the third light source unit, and forms a multiple radiation region by causing the first radiation region, the second radiation region and the third radiation region to overlap one another.

Accordingly, the light intensity for a radiation region can be increased by a simple structure, and the radiation condition for growing plants can be optimized, and thus it is possible to use an inexpensive laser diode which is used for BD recorders or DVD recorders that are commercially available in large quantities, instead of an expensive high-output laser diode for a laser display. The inexpensive laser diode is advantageous in heat radiation characteristics since high output is not required, and application to plants requiring a high light intensity is made possible.

Furthermore, by determining the number of light source units for irradiating the multiple radiation region according to the light intensity required by plant 30 for cultivation, an optimal multiple radiation region can be set.

Third Exemplary Embodiment 3-1. Structure of Light Source Section

Next, a light source section of a plant cultivation apparatus according to a third exemplary embodiment will be described. A light source unit of the light source section according to the present exemplary embodiment has a different structure from that of the light source units according to the first exemplary embodiment and the second exemplary embodiment.

Figure 9:
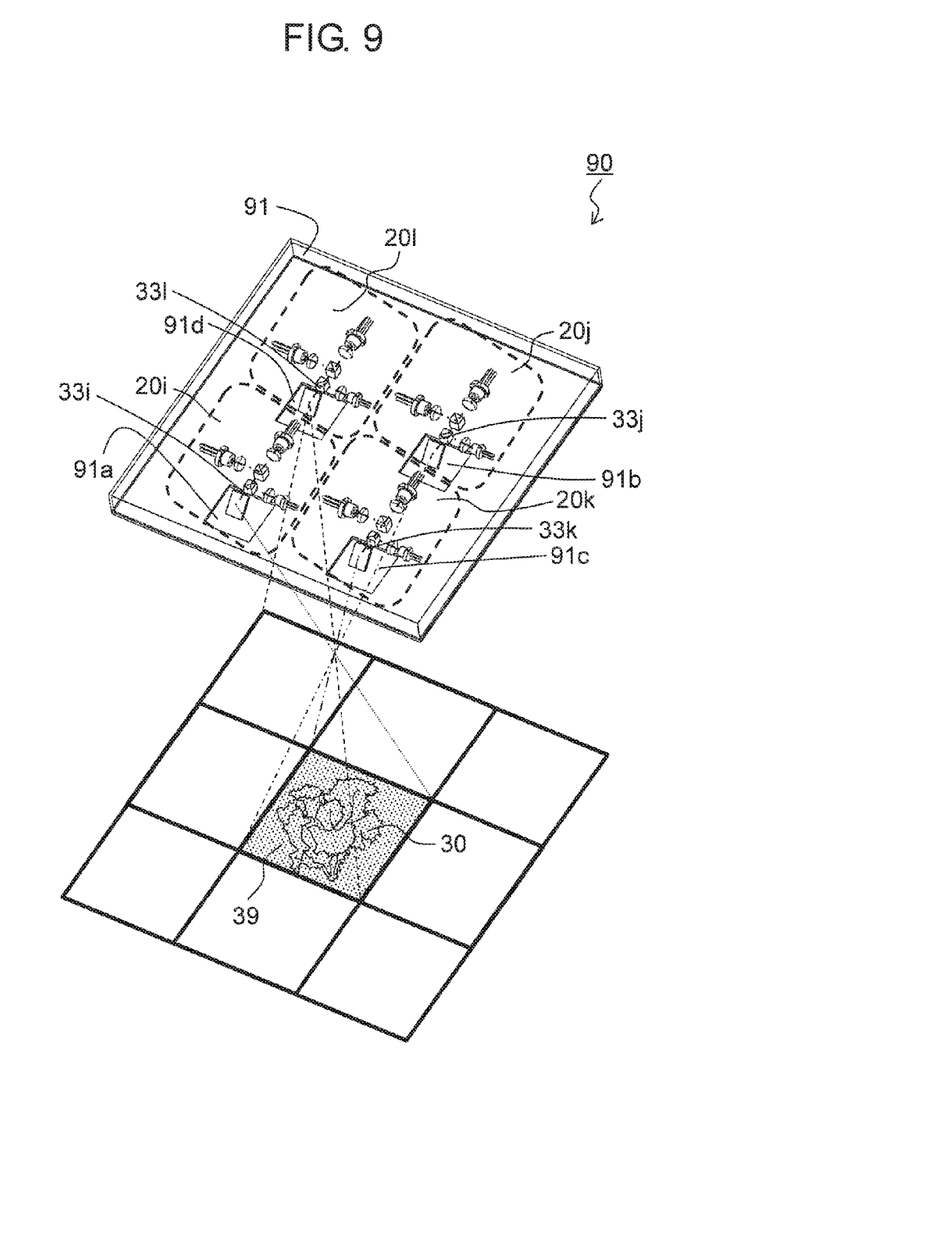
FIG. 9 is a perspective diagram of a structure of a light source section according to a third exemplary embodiment, and a radiation region thereof.
Figure 10:
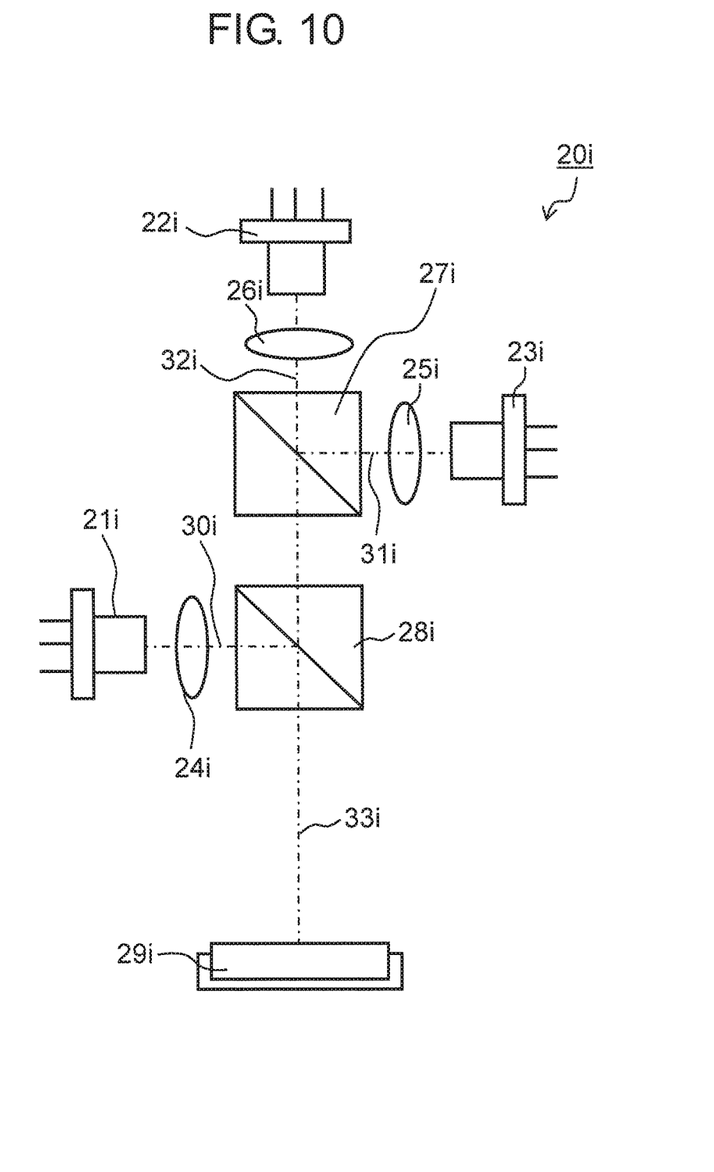
FIG. 10 is a schematic diagram of one light source unit of the light source section according to the third exemplary embodiment.

FIG. 9 is a perspective diagram of the structure of light source section 90 according to the present exemplary embodiment, and a radiation region thereof, and FIG. 10 is a schematic diagram of first light source unit 20i, which is one light source unit of light source section 90 according to the present exemplary embodiment.

In FIG. 9, light source section 90 includes first light source unit 20i, second light source unit 20j, third light source unit 20k, and fourth light source unit 20l. First light source unit 20i, second light source unit 20j, third light source unit 20k, and fourth light source unit 20l have the same structure.

In FIG. 10, first light source unit 20i includes first laser diodes 21i, 22i, and 23i, first lenses 24i, 25i, and 26i, optical elements 27i and 28i, first mirror scanning mechanism 29i, and a monitoring section, not shown. First laser diode 21i emits first light beam 30i, first laser diode 22i emits first light beam 32i, and first laser diode 23i emits first light beam 31i.

Optical element 27i transmits first light beam 32i, and reflects first light beam 31i, and optical element 28i transmits first light beam 32i and first light beam 31i, and reflects first light beam 30i.

In the case where first laser diodes 22i and 23i are of the same wavelength band, optical element 27i can realize transmission and reflection by having a tilt difference of 90 degrees between the positions of first laser diodes 22i and 23i with the light beam direction as the rotation axis.

First light beams 30i, 31i, and 32i are combined, and first combined light beam 33i output from optical element 28i is two-dimensionally scanned by first mirror scanning mechanism 29i to form a planar first radiation region. In the same manner, a second radiation region, a third radiation region, and a fourth radiation region are formed by second light source unit 20j, third light source unit 20k, and fourth light source unit 20l, respectively, and by these radiation regions overlapping one another, multiple radiation region 39 including plant 30 is formed.

Here, desirably, first laser diodes 22i and 23i are in the red wavelength band, and first laser diode 21i is in the blue wavelength band.

The reason why the red wavelength band is plurally used is that the red wavelength band around 660 nm is most efficient for plants such as lettuces to photosynthesize, and that the light intensity in the red wavelength band is often increased. The reason why the blue wavelength band is used is that, especially during raising of seedling, plants have the characteristic to grow toward blue light for morphogenesis. However, in the case of growing mushrooms, which do not photosynthesize, first laser diodes 22i and 23i may be in the blue wavelength band.

Light source section 90 includes first light source unit 20i, second light source unit 20j, third light source unit 20k, and fourth light source unit 20l, and first light source unit 20i, second light source unit 20j, third light source unit 20k, and fourth light source unit 20l are disposed inside outer box 91. Opening sections 91a, 91b, 91c, and 91d are provided to outer box 91, and two-dimensionally scanned first combined light beam 33i of first light source unit 20i is radiated out from opening section 91a, two-dimensionally scanned second combined light beam 33j of second light source unit 20j is radiated out from opening section 91b, two-dimensionally scanned third combined light beam 33k of third light source unit 20k is radiated out from opening section 91c, and two-dimensionally scanned fourth combined light beam 33l of fourth light source unit 20l is radiated out from opening section 91d.

Furthermore, like the structure according to the second exemplary embodiment described with reference to FIG. 8, by increasing the light source units, and increasing the multiple radiation regions, even in the case of a growing region having a large growing area such as a plant factory, the area of the multiple radiation region with a high light intensity can be increased.

3-2. Effects

As described above, the plant cultivation apparatus according to the present exemplary embodiment includes a first light source unit configured to include a plurality of first laser diodes, an optical element combining a plurality of first light beams radiated by the plurality of first laser diodes and radiating a first combined light beam, and a first scanning mechanism scanning the first combined light beam and forming a first radiation region, a second light source unit configured to include a plurality of second laser diodes, an optical element combining a plurality of second light beams radiated by the plurality of second laser diodes and radiating a second combined light beam, and a second scanning mechanism scanning the second combined light beam and forming a second radiation region, and a signal processor configured to control the first light source unit and the second light source unit. A wavelength of the first light beams is the same as a wavelength of the second light beams. The signal processor forms a multiple radiation region by causing the first radiation region and the second radiation region to overlap each other.

When a plurality of laser diodes in different wavelength bands are used for one light source unit, an effect that a plant grows according to the wavelength bands is obtained, and when a plurality of laser diodes in the same wavelength band are used, the light intensity for a radiation region can be increased. Accordingly, the light intensity for a radiation region can be increased by a simple structure, and the radiation condition for growing plants can be optimized, and thus it is possible to use an inexpensive laser diode which is used for BD recorders or DVD recorders that are commercially available in large quantities, instead of an expensive high-output laser diode for a laser display. The inexpensive laser diode is advantageous in heat radiation characteristics since high output is not required, and application to plants requiring a high light intensity is made possible.

Additionally, in the first exemplary embodiment, the second exemplary embodiment, and the third exemplary embodiment, scanning by the mirror scanning mechanism for securing an area for the multiple radiation region may not be necessary depending on plant 30 for cultivation, and in such a case, an overlapped multiple radiation region may be formed by using an angle of radiation of the laser diode, without using the mirror scanning mechanism.

The present disclosure is useful for a plant cultivation apparatus for growing a plant with an artificial light source.

What is claimed is:

1. A plant cultivation apparatus comprising:
   a first light source unit configured to include a first laser diode radiating a first light beam, and a first scanning mechanism scanning the first light beam and forming a first radiation region;
   a second light source unit configured to include a second laser diode radiating a second light beam, and a second scanning mechanism scanning the second light beam and forming a second radiation region; and
   a signal processor configured to control the first light source unit and the second light source unit,
   wherein a wavelength of the first light beam is the same as a wavelength of the second light beam, the signal processor forms a multiple radiation region by causing the first radiation region and the second radiation region to overlap each other, and the first scanning mechanism allows for movement of the first light beam relative to the second light beam.

2. The plant cultivation apparatus according to claim 1, wherein an area of the multiple radiation region is a quarter or more of an area of one of the first radiation region and the second radiation region.

3. The plant cultivation apparatus according to claim 1, wherein the first light source unit is disposed diagonally to the second light source unit.

4. The plant cultivation apparatus according to claim 1, wherein the first light source unit is disposed parallel to the second light source unit along a same line.

5. The plant cultivation apparatus according to claim 1, further comprising a third light source unit configured to include a third laser diode radiating a third light beam, and a third scanning mechanism scanning the third light beam and forming a third radiation region, wherein the signal processor controls the first light source unit, the second light source unit and the third light source unit, and forms a multiple radiation region by causing the first radiation region, the second radiation region and the third radiation region to overlap one another.

6. A plant cultivation apparatus comprising:

a first light source unit configured to include a plurality of first laser diodes, an optical element combining a plurality of first light beams radiated by the plurality of first laser diodes and radiating a first combined light beam, and a first scanning mechanism scanning the first combined light beam and forming a first radiation region;

a second light source unit configured to include a plurality of second laser diodes, an optical element combining a plurality of second light beams radiated by the plurality of second laser diodes and radiating a second combined light beam, and a second scanning mechanism scanning the second combined light beam and forming a second radiation region; and a signal processor configured to control the first light source unit and the second light source unit, wherein each of the first combined light beam and the second combined light beam includes a red light at the same wavelength, the signal processor forms a multiple radiation region by causing the first radiation region and the second radiation region to overlap each other, and the first scanning mechanism allows for movement of the first combined light beam relative to the second combined light beam.

7. The plant cultivation apparatus according to claim 1, wherein the first light beam and the second light beam are red light at the same wavelength or blue light at the same wavelength.

8. The plant cultivation apparatus according to claim 7, wherein the first light beam and the second light beam are in a red wavelength band of 630 nanometers to 680 nanometers or in a blue wavelength band of 380 nanometers to 500 nanometers.

9. The plant cultivation apparatus according to claim 1, wherein the signal processor individually controls the first scanning mechanism and the second scanning mechanism.

10. A plant cultivation apparatus comprising:

a first light source unit configured to include a first laser diode which radiates a first light beam at a first wavelength, a second laser diode which radiates a second light beam at a second wavelength, an optical element combining the first light beam and the second light beam as a first combined light beam, and a first scanning mechanism scanning the first combined light beam and forming a first radiation region;

a second light source unit configured to include a third laser diode which radiates a third light beam at the first wavelength, a fourth laser diode which radiates a fourth light beam at the second wavelength, an optical element combining the third light beam and the fourth light beam as a second combined light beam, and a second scanning mechanism scanning the second combined light beam and forming a second radiation region; and a signal processor configured to control the first light source unit and the second light source unit, wherein the signal processor forms a multiple radiation region by causing the first radiation region and the second radiation region to overlap each other, and the first scanning mechanism allows for movement of the first combined light beam relative to the second combined light beam.

11. The plant cultivation apparatus according to claim 10, wherein the first wavelength is a wavelength of red light, and the second wavelength is a wavelength of blue light.

12. The plant cultivation apparatus according to claim 11, wherein the wavelength of red light is in a wavelength band of 630 nanometers to 680 nanometers, and the second wavelength is in a wavelength band of 380 nanometers to 500 nanometers.

13. The plant cultivation apparatus according to claim 10, wherein the signal processor individually controls the first scanning mechanism and the second scanning mechanism.

14. The plant cultivation apparatus according to claim 1, wherein the first radiation region and the second radiation region only partially overlap each other.

15. The plant cultivation apparatus according to claim 6, wherein the first radiation region and the second radiation region only partially overlap each other.

16. The plant cultivation apparatus according to claim 10, wherein the first radiation region and the second radiation region only partially overlap each other.

17. The plant cultivation apparatus according to claim 1, wherein the second scanning mechanism allows for movement of the second light beam relative to the first light beam.

18. The plant cultivation apparatus according to claim 6, wherein the second scanning mechanism allows for movement of the second combined light beam relative to the first combined light beam.

19. The plant cultivation apparatus according to claim 10, wherein the second scanning mechanism allows for movement of the second combined light beam relative to the first combined light beam.

* * * * *